United States Patent
Higashira et al.

(10) Patent No.: US 6,889,794 B2
(45) Date of Patent: May 10, 2005

(54) ELECTRIC POWER STEERING SYSTEM

(75) Inventors: Hideki Higashira, Ikoma (JP); Yoshiaki Nakano, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 76 days.

(21) Appl. No.: 10/119,960

(22) Filed: Apr. 11, 2002

(65) Prior Publication Data

US 2002/0148675 A1 Oct. 17, 2002

(30) Foreign Application Priority Data

Apr. 16, 2001 (JP) ........................................ 2001-117092

(51) Int. Cl.$^7$ ................................................ B62D 5/04
(52) U.S. Cl. ...................................... 180/444; 180/446
(58) Field of Search .................... 701/41, 42; 180/443, 180/444, 446

(56) References Cited

U.S. PATENT DOCUMENTS

| | | | | | |
|---|---|---|---|---|---|
| 5,355,315 A | * | 10/1994 | Daido | ........................ | 180/446 |
| 5,573,079 A | * | 11/1996 | Suda | ........................... | 180/444 |
| 5,641,916 A | * | 6/1997 | Satoh | ..................... | 73/862.331 |
| 5,732,790 A | * | 3/1998 | Endo | ........................... | 180/444 |
| 5,810,111 A | * | 9/1998 | Takeuchi | ..................... | 180/443 |
| 5,828,972 A | | 10/1998 | Asanuma et al. | | |
| 5,975,234 A | * | 11/1999 | Bugosh | ....................... | 180/444 |
| 6,123,167 A | * | 9/2000 | Miller | ......................... | 180/444 |
| 6,211,631 B1 | * | 4/2001 | Wilson-Jones et al. | ..... | 180/444 |
| 6,332,506 B1 | * | 12/2001 | Kifuku | ........................ | 180/404 |
| 6,474,438 B1 | * | 11/2002 | Penketh | ....................... | 180/444 |
| 6,522,962 B2 | * | 2/2003 | Millsap | ........................ | 701/41 |

FOREIGN PATENT DOCUMENTS

| | | |
|---|---|---|
| DE | 42 08 404 | 9/1992 |
| DE | 42 28 893 | 3/1994 |
| EP | 0 984 256 | 3/2000 |
| EP | 1 035 002 | 9/2000 |
| JP | 08-11730 | 1/1996 |

* cited by examiner

Primary Examiner—Daniel G. DePumpo
(74) Attorney, Agent, or Firm—Rabin & Berdo, P.C.

(57) ABSTRACT

An electric power steering system according to the present invention comprises: a sensor module including a steering torque sensor and a control circuit housed therein; and a motor module including an electric motor and a motor driving circuit housed therein. The sensor module and the motor module are physically separately mounted in the electric power steering system. Since the sensor module and the motor module are physically separated, these modules can separately be produced, and the steering torque sensor and the electric motor can independently be adjusted.

10 Claims, 6 Drawing Sheets

ELECTRIC POWER STEERING SYSTEM

Priority is claimed for this application based on application No. 2001-117092 filed on Apr. 16, 2001 in Japan.

BACKGROUND OF THE INVENTION

1. Field of the Invention

The present invention relates to an electric power steering system which controls the driving of an electric motor on the basis of the steering state of a motor vehicle represented by a steering torque, a steering angle, a yaw rate and the like.

2. Description of the Related Art

In an electric power steering system, the rotation of a steering wheel is transmitted to a steering mechanism via a steering shaft. A steering assist force is transmitted to the steering mechanism from an electric motor in accordance with a steering angle, a steering torque, a yaw rate and the like.

There has been proposed an electric power steering system in which a housing accommodating a steering torque sensor, a steering torque sensor signal processing circuit (sensor module) and an electric motor driving circuit (motor module) is mounted integrally on an electric motor so that a wiring distance is reduced for easy assembling thereof (see Japanese Unexamined Patent Publication No. 8-11730 (1996)).

In this electric power steering system, the sensor module and the motor module are mounted together with a single microprocessor on the same board. Therefore, the entire board should be redesigned every time the specifications of the steering torque sensor or the electric motor (e.g., the capacity of the electric motor for a vehicle model) are changed. Hence, there is a need for designing a board for each vehicle model, requiring a greater effort for the designing. This leads to cost increase.

It is therefore an object of the present invention to provide an electric power steering system which includes a sensor module and a motor module physically separately provided therein, so that the sensor module and the motor module can separately be produced, and a sensor such as a steering torque sensor, a steering angle sensor or a yaw rate sensor and an electric motor can independently be adjusted for correction of variations thereof.

BRIEF SUMMARY OF THE INVENTION

The electric power steering system according to the present invention comprises a first module including a steering state detector and a control circuit housed therein, and a second module including an electric motor and a motor driving circuit housed therein. The first module and the second module are separately mounted in the electric power steering system.

With this arrangement, the first module is adapted to detect a steering state and compute a target assist amount, and the second module is adapted to control the rotation of the electric motor on the basis of the target assist amount. Thus, variations in the capacity of the electric motor can be accommodated simply by modifying the second module. Therefore, the electric power steering system is applicable to various vehicle models, thereby allowing for cost reduction.

Where the computation of the target assist amount is based on a steering torque, the steering state detector is a steering torque sensor for detecting the steering torque. Where the computation of the target assist amount is based on a steering angle or a vehicle yaw rate, the steering state detector is a steering angle sensor or a yaw rate sensor.

The steering torque sensor may be a steering torque sensor of phase difference type. The phase difference type steering torque sensor is capable of detecting a phase difference between a steering angle on a steering wheel side and a steering angle on a motor side as well as an absolute steering angle on the steering wheel side and an absolute steering angle on the motor side. Thus, the steering angle can be detected by the steering torque sensor as well as by a steering angle sensor generally provided on the motor side. Even if one of the steering torque sensor and the steering angle sensor happens to malfunction, data inputted from the other sensor can be employed for continuously performing an assist operation (steering assist operation).

It is preferred that the first module and the second module individually include central processing circuits. Thus, the adjustment of the steering state detector and the adjustment of the electric motor can easily and separately be achieved within the first module and the second module, respectively.

The central processing circuit of the first module and the central processing circuit of the second module are preferably connected to each other via a communication line so as to be mutually monitored by each other to check for malfunction thereof.

The first module preferably has a function of correcting the steering state detector. Thus, variations in the detection by the steering state detector can be corrected which may occur due to intrinsic errors and assembly errors of the steering state detector, an environmental change and aging.

The second module preferably has a function of correcting the electric motor. Thus, variations in the operation of the electric motor can be corrected which may occur due to intrinsic errors and assembling errors of the electric motor, an environmental change and aging.

A specific embodiment of the present invention will hereinafter be described with reference to the following drawings.

DETAILED DESCRIPTION OF THE INVENTION

In an electric power steering system, the rotation of a steering wheel is mechanically transmitted to a steering mechanism via a steering shaft. A steering assist force is transmitted from an electric brushless motor (hereinafter referred to simply as "electric motor") to either the steering mechanism or the steering shaft.

The steering mechanism includes a pinion provided at an end of the steering shaft, and a rack shaft threadingly engaged with the pinion and extending transversely of a motor vehicle (along the width of the motor vehicle). Tie rods are respectively coupled with opposite ends of the rack shaft, and further coupled with knuckle arms which respectively support right and left front wheels as steerable wheels.

With this arrangement, when the steering wheel is operated to rotate the steering shaft, the rotation of the steering shaft is converted into a linear movement transverse to the motor vehicle by the pinion and the rack shaft. Thus, the right and left front wheels are turned.

The steering shaft is divided into an input shaft connected to the side of the steering wheel and an output shaft connected to the side of the steering mechanism. The input shaft and the output shaft are coupled with each other by a torsion bar. The torsion bar is twisted according to a steering torque, and the amount and direction of the resulting torsion is detected by a steering torque sensor.

A steering angle sensor is provided in association with the output shaft for detecting a rotation angle of the output shaft for detection of a steering angle of the steering mechanism.

A yaw rate sensor (e.g., a vibration gyro, a fiber optic gyro or the like) is provided in the electric power steering system for detecting a turning angle of the motor vehicle about a vertical axis.

In the following embodiment of the present invention, a sensor module incorporating the steering torque sensor is taken as an example. However, it should be understood that the present invention be not limited to the embodiment, but may be applied to a sensor module incorporating the steering angle sensor or the yaw rate sensor.

Figure 1:
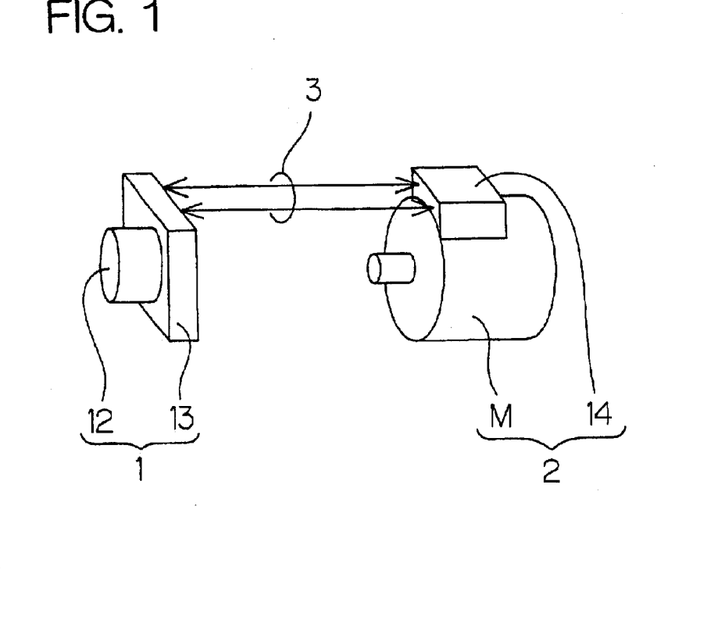
FIG. 1 is a diagram illustrating connection between a control circuit 13 mounted on a housing of a steering torque sensor 12 and a motor driving circuit 14 mounted on a housing of an electric motor M via a communication line in accordance with an embodiment of the present invention.

FIG. 1 is a diagram illustrating a sensor module (corresponding to the first module) 1 and a motor module (corresponding to the second module) 2 connected to each other via a communication line 3. The sensor module 1 incorporates therein a steering torque sensor 12 and a control circuit 13, while the motor module 2 incorporates therein an electric motor M and a motor driving circuit 14.

A cable (not shown) for transmitting a signal from the steering torque sensor 12 to the control circuit 13 is incorporated in the sensor module 1. A cable and terminals for transmitting a motor driving signal from the motor driving circuit 14 to the electric motor M will be described later with reference to FIGS. 5A and 5B, FIGS. 6A and 6B, and FIGS. 7A and 7B.

Figure 2:
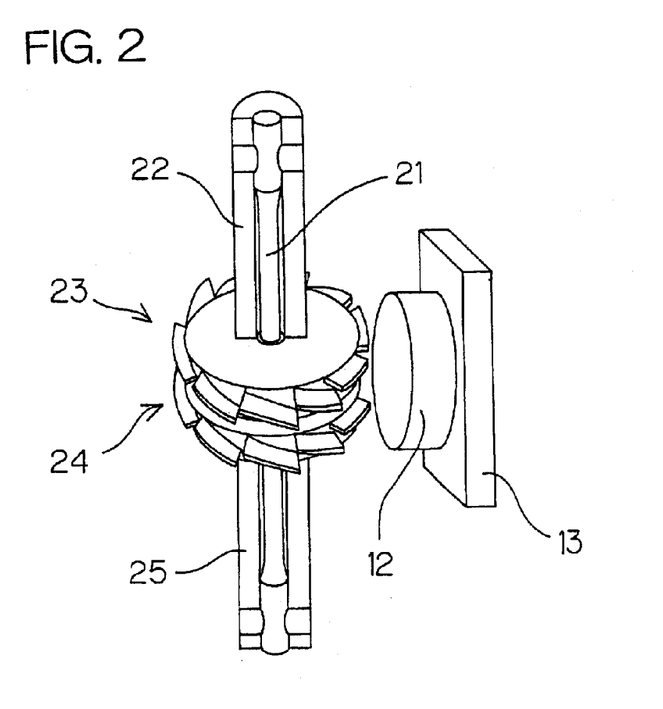
FIG. 2 is a perspective view illustrating a steering torque sensor 12 of phase difference type.

FIG. 2 is a perspective view illustrating a steering torque sensor of phase difference type as a specific example of the steering torque sensor 12. A metal fan 23 to be detected is fitted around a cylindrical portion 22 coupled with an upper end of the torsion bar 21, and a metal fan 24 to be detected is fitted around a cylindrical portion 25 coupled with a lower end of the torsion bar 21. A rotational phase difference between the fans 23 and 24 is detected by two MR sensors (magneto-resistive effect devices) provided in the steering torque sensor 12, whereby the torque applied to the torsion bar 21 is detected. Even if one of the two MR sensors malfunctions, the detection of the torque is possible. Therefore, the assist operation can continuously be performed.

Further, the absolute rotational position of the metal fan 23 or 24 can be detected, so that an absolute steering angle can also be detected. Thus, the steering angle sensor and the absolute steering angle sensor constitute a duplex detection system. Even if one of the steering angle sensor and the absolute steering angle sensor malfunctions, the detection of the steering angle is possible.

An output signal of the steering torque sensor 12 is inputted to the control circuit 13. The control circuit 13 determines a target assist electric current of the electric motor M in accordance with the steering torque detected by the steering torque sensor 12, and outputs a target assist electric current signal via the communication line 3 (see FIG. 1).

On the other hand, the motor driving circuit 14 is mounted on a housing of the electric motor M (see FIG. 1). The motor driving circuit 14 controls the driving of the electric motor M on the basis of the target assist electric current signal applied through the communication line 3 so as to apply a steering assist force according to the steering torque to the steering shaft.

Figure 3:
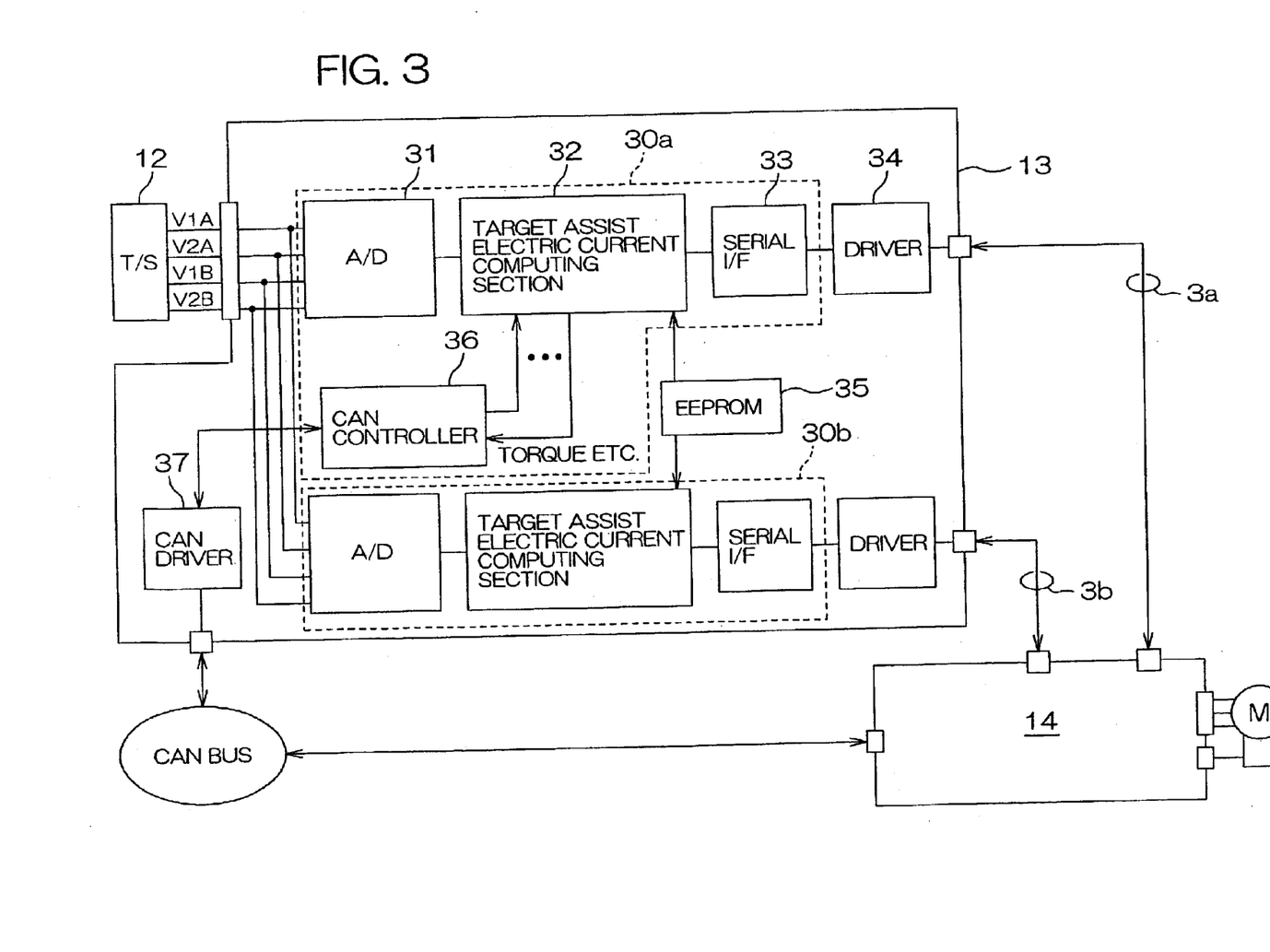
FIG. 3 is a block diagram for explaining the function of the control circuit 13.

FIG. 3 is a block diagram for explaining the function of the control circuit 13. The control circuit 13 includes two CPUs including a main CPU 30a and a sub CPU 30b. The sub CPU 30b is provided for a case where the main CPU 30a malfunctions (or fails).

Next, an explanation will be given to the function of the main CPU 30a. The sub CPU 30b has substantially the same function as the main CPU 30a.

A phase difference detection signal transmitted from the steering torque sensor 12 is converted into a digital signal by an A/D converter 31. On the basis of the digital signal, a target assist electric current computing section 32 computes the target assist electric current to be supplied to the electric motor M for assisting a steering operation. A signal indicative of the value of the electric current thus computed is serially converted by a serial communication interface circuit 33, and outputted to a serial communication line 3a via a driver 34.

The control circuit 13 further includes a nonvolatile memory (EEPROM) 35 which stores therein correction values for correction of intrinsic errors such as variations in the gain of the output signal of the steering torque sensor 12 and the offset of the output signal, which are required for the computation of the target assist electric current in the target assist electric current computing section 32. Writing of the correction values in the EEPROM 35 is carried out at pre-shipment adjustment of the control circuit 13 connected to the steering torque sensor 12. The values written in the EEPROM 35 are values according to the intrinsic characteristics of the steering torque sensor 12.

The EEPROM 35 is rewritable, so that the writing can be carried out not only at the pre-shipment adjustment but also after prolonged use. Thus, the errors of the steering torque sensor 12 can be corrected on the basis of an environmental change and aging associated with the steering torque sensor 12.

The steering angle, a steering angular speed, the steering toque, failure information, the target assist electric current and like information used in the target assist electric current computing section 32 are collected by a CAN (control area network) controller 36, and outputted to a CAN bus via a CAN driver 37. Vehicle speed information is supplied to the target assist electric current computing section 32 from the CAN bus via the CAN controller 36, and used for the computation of the target assist electric current.

Figure 4:
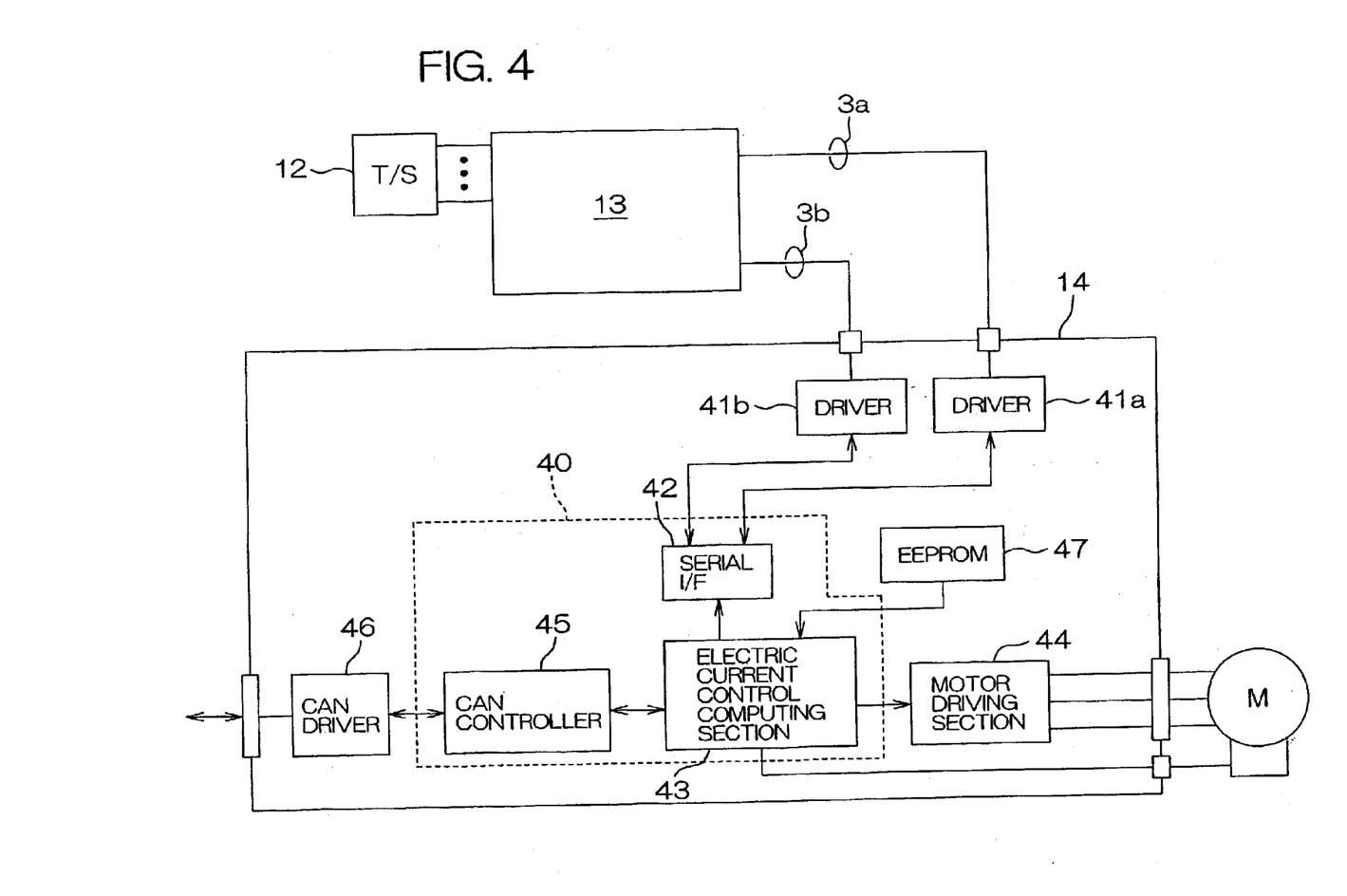
FIG. 4 is a block diagram for explaining the function of the motor driving circuit 14.

FIG. 4 is a block diagram for explaining the function of the motor driving circuit 14. The motor driving circuit 14 includes a CPU 40. The motor driving circuit 14 is connected to the control circuit 13 via serial communication lines 3a, 3b. Signals from the serial communication lines 3a, 3b are inputted to an electric current control computing circuit 43 via drivers 41a, 41b and a serial communication interface circuit 42. In the electric current control computing circuit 43, an output signal is generated according to the target assist electric current, and applied to a motor driving section 44. The motor driving section 44 converts the output signal into a PWM-modulated electric current signal, and drives the electric motor M on the basis of this signal. An electric current flowing through the electric motor M, a rotor position and failure detection information are outputted to a CAN bus through a CAN controller 45 and a CAN driver 46.

The CPUs 30a, 30b shown in FIG. 3 and the CPU 40 are mutually monitored by each other via the serial communication lines 3a, 3b to check formal function thereof.

The motor driving circuit 14 includes an EEPROM 47, which stores therein correction values for correction of variations in the cogging torque ripple and induced voltage of the electric motor (brushless motor) M employed in combination with the motor driving circuit. Writing of the correction values in the EEPROM 47 is carried out at the pre-shipment adjustment. The values written in the EEPROM 47 are values according to the intrinsic characteristics of the electric motor M.

The EEPROM 47 is rewritable, so that the writing can be carried out not only at the pre-shipment adjustment but also after prolonged use. Thus, the errors of the electric motor M can be corrected on the basis of an environmental change and aging associated with the electric motor.

FIGS. 5A and 5B, FIGS. 6A and 6B, and FIGS. 7A and 7B are perspective views illustrating the connection between the motor driving circuit 14 and the electric motor M in the motor module 2.

Figure 5A:
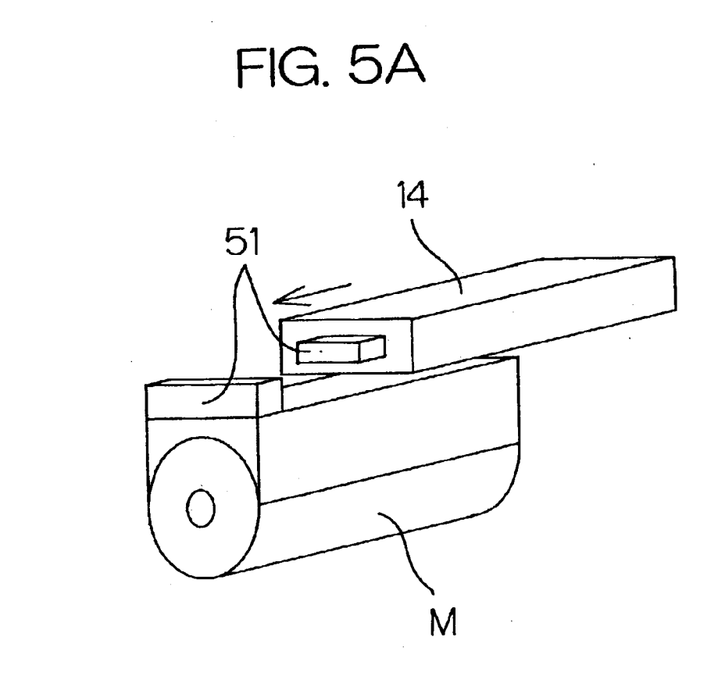
FIG. 5A is a perspective view illustrating connection to be established between the motor driving circuit 14 and the electric motor M with the use of a connector alone in a motor module.
Figure 5B:
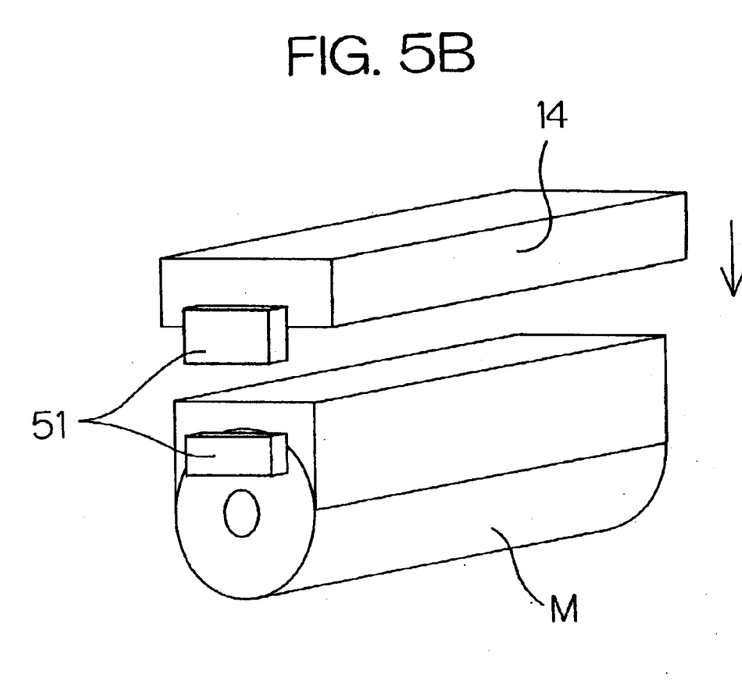
FIG. 5B is a perspective view illustrating connection to be established between the motor driving circuit 14 and the electric motor M with the use of a connector alone in the motor module.

FIGS. 5A and 5B each illustrate the connection to be established through terminals 51 alone. The connection is established on an upper side face of the electric motor M in FIG. 5A, and on a side face of the electric motor M in FIG. 5B.

Figure 6A:
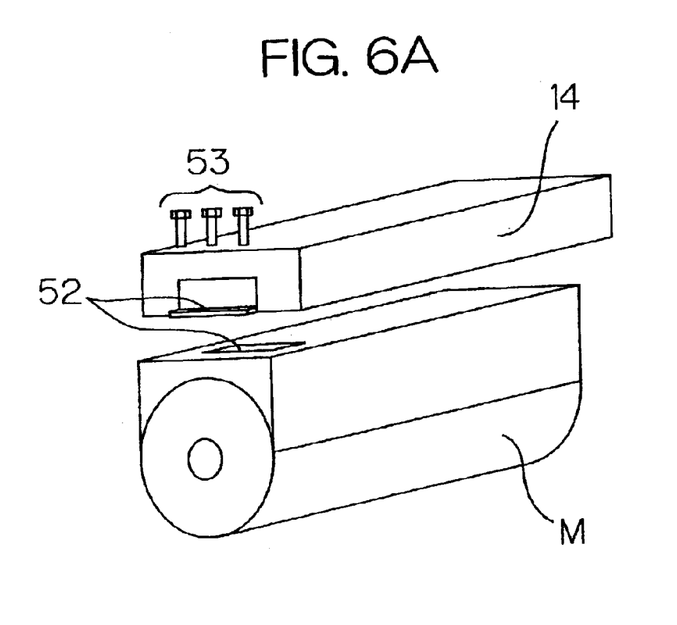
FIG. 6A is a perspective view illustrating connection to be established between the motor driving circuit 14 and the electric motor M with the use of screws in the motor module.
Figure 6B:
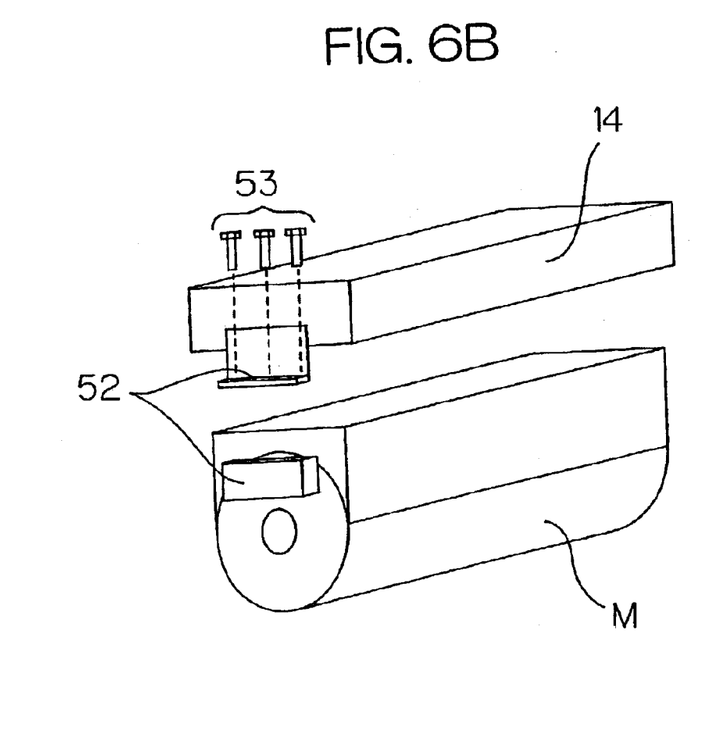
FIG. 6B is a perspective view illustrating connection to be established between the motor driving circuit 14 and the electric motor M with the use of screws in the motor module.

FIGS. 6A and 6B each illustrate the connection to be established through terminals 52 with the use of screws 53. The connection is established on the upper side face of the electric motor M in FIG. 6A, and on the side face of the electric motor M in FIG. 6B. By fixing the terminals with the use of the screws 53, the terminals 52 are kept in press contact with each other, so that the connection is firmly established.

Figure 7A:
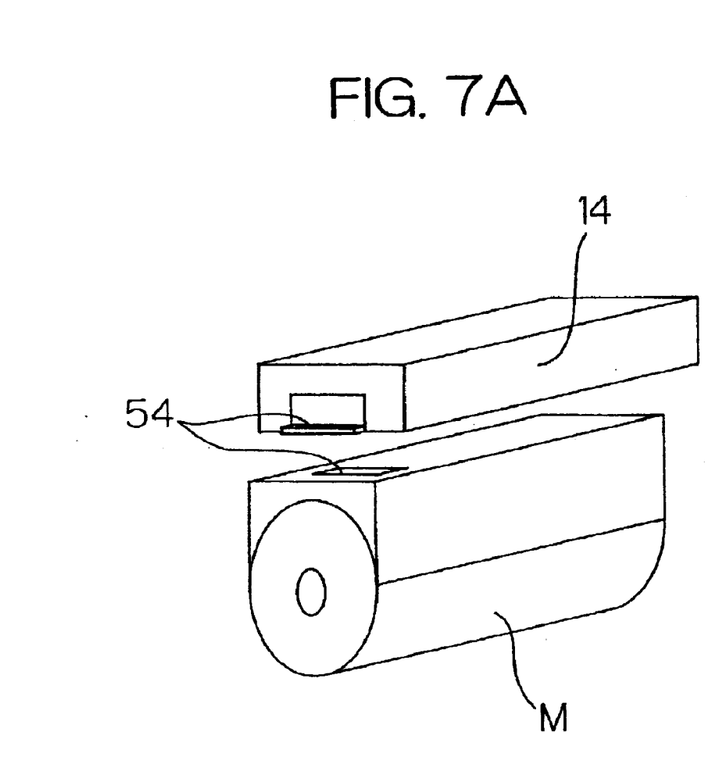
FIG. 7A is a perspective view illustrating connection to be established between the motor driving circuit 14 and the electric motor N by way of welding in the motor module.
Figure 7B:
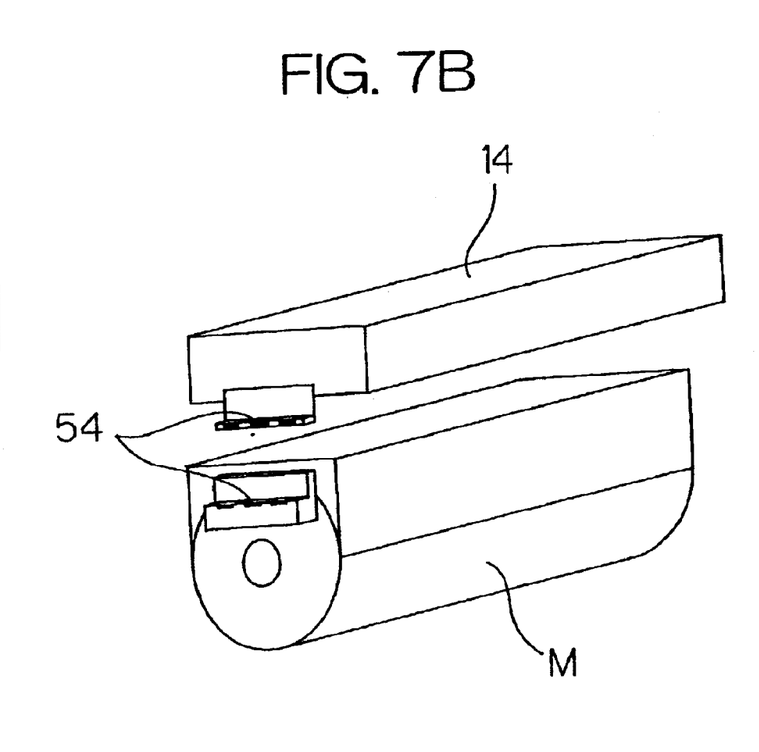
FIG. 7B is a perspective view illustrating connection to be established between the motor driving circuit 14 and the electric motor M by way of welding in the motor module.

FIGS. 7A and 7B each illustrate the connection to be established through terminals 54 by way of partial welding. The connection is established on the upper side face of the electric motor M in FIG. 7A, and on the side face of the electric motor M in FIG. 7B. By the welding, the terminals 54 are kept in press contact with each other, so that the connection is further firmly established.

Since a high amperage electric current flows through the terminals, the connection with the use of the screws (FIGS. 6A and 6B) or the connection by way of the welding (FIGS. 7A and 7B) is more preferable than the connection with the use of the connector (FIGS. 5A and 5B).

While the embodiment of the present invention has thus been described, it should be understood that the invention be not limited to these embodiments.

(1) The present invention is applicable to a sensor module including a steering angle sensor. In this case, the control circuit 13 has a function of computing the target assist electric current on the basis of a steering angle detected by the steering angle sensor.

(2) The present invention is applicable to a sensor module including a yaw rate sensor. In this case, the control circuit 13 has a function of computing the target assist electric current on the basis of a yaw rate detected by the yaw rate sensor.

(3) The present invention is applicable to a case where the target assist electric current is computed by employing two or more of the steering torque sensor, the steering angle sensor and the yaw rate sensor in combination. In this case, the two or more sensors are housed in the sensor module.

Besides, various modifications may be made within the scope of the present invention.

What is claimed is:

1. An electric power steering system including a steering state detector for detecting a steering state of a motor vehicle, a control circuit which generates a control signal for controlling an electric motor on the basis of the steering state of the motor vehicle detected by the steering state detector, and a motor driving circuit which generates a signal for driving the electric motor on the basis of an output of the control circuit, the electric power steering system comprising:

a first module in which the steering state detector and the control circuit are housed; and a second module in which the electric motor and the motor driving circuit are housed, wherein the first module includes a central processing unit for computing the control signal, and the second module includes a central processing unit for computing an output signal according to the control signal, wherein the first module and the second module are separately mounted in the electric power steering system.

2. An electric power steering system as set forth in claim 1, wherein the steering state detector is a at torque sensor for detecting a steering torque.

3. An electric power steering system as set forth in claim 2, wherein the steering torque sensor is a sensor for detecting rotational phase difference between ends of a torsion bar.

4. An electric power steering system as set forth in claim 1, wherein the steering stale detector is a steering angle sensor for detecting a steering angle.

5. An electric power steering system as set forth in claim 1, wherein the steering state detector is a rate sensor for detecting a yaw rate of the motor vehicle.

6. An electric power steering system as set forth in claim 1, wherein the central processing unit of the first module and the central processing unit of the second module are mutually monitored by each other to check for malfunction thereof.

7. An electric power steering system as set forth in claim 1, wherein the first module has a function of correcting errors associated with environmental change the aging of the steering state detector.

8. An electric power steering system as set forth in claim 1, wherein the second module a function of correcting errors associated with environmental change and aging of the electric motor.

9. An electric power steering system as set forth in claim 7, wherein the first module further includes a non-volatile memory for storing correction values and the function of correcting errors associated with the steering state detector is performed by the central processing unit of the first module on the basis of the stored correction values.

10. An electric power steering system as set forth in claim 8, wherein the second module further includes a non-volatile memory for storing correction values and the function of correcting errors associated with the electric motor is performed by the central processing unit of the second module on the basis of the stored correction values.

* * * * *